Patented May 30, 1950

2,509,857

UNITED STATES PATENT OFFICE 2,509,857

COMPATIBILIZED RESIN COMPOSITIONS

Gerald T. Borcherdt and Henry S. Rothrock, Wilmington, Del., assignors to E. I. du Pont de Nemours & Company, Wilmington, Del., a corporation of Delaware No Drawing. Application July 9, 1945, Serial No. 604,086

4 Claims. (Cl. 260—29.6)

This invention relates to new compositions containing water-insoluble organic polymers compatibilized by the incorporation of certain water-soluble organic polymers. More particularly, it refers to compositions containing a water-insoluble monoethylenic carbalkoxy polymer blended with a water-soluble hydrolyzed interpolymer of ethylene and a vinyl carboxylate, continuous flexible films prepared therefrom, and articles coated with said films.

It is well known that synthetic polymers may be prepared by emulsion polymerization of vinyl monomers. These polymeric dispersions constitute an economical and readily available form of polymers. Unfortunately, however, the employment of these dispersions in the coating and finishing fields is seriously limited because in nearly all cases the dispersions do not form films on drying but instead form only discontinuous, brittle powders. It has, therefore, been a problem to develop polymer dispersion compositions from which continuous films of desirable quality might be obtained. To date, so far as is known, but mediocre success has been attained in the solution of this problem.

It is an object of this invention to develop polymer dispersions which will produce continuous films of desirable quality. A further object is to incorporate in aqueous dispersions of synthetic polymers a compatibilizing material or materials which will, under drying of the dispersion, produce continuous films of the synthetic polymer having desirable characteristics. A still further object of the invention is to produce articles which are coated or finished with continuous films of synthetic polymers produced as aforesaid. Additional objects will become apparent from a consideration of the following description and claims.

These objects are attained in accordance with the present invention wherein an aqueous dispersion of a water-insoluble monoethylenic carbalkoxy polymer is blended with an aqueous solution of a water-soluble hydrolyzed interpolymer of ethylene and a vinyl carboxylate and the blended dispersion is spread over a base material and dried. In a more restricted sense, this invention is concerned with the foregoing process wherein the compatibilizing agent is a water-soluble hydrolyzed interpolymer of ethylene and vinyl acetate, preferably a substantially completely hydrolyzed interpolymer containing between about 0.5% and about 10% by weight of ethylene. In a still more restricted sense the invention is concerned with a process of the type referred to previously wherein the water-soluble and the water-insoluble components of the dispersion are so proportioned that the dispersion contains between 20 and 85 parts by weight of the water-insoluble polymer and between 15 and 80 parts by weight of the water-soluble polymer. In its preferred embodiment the water-insoluble polymer employed as aforesaid is a polymerized vinyl resin which is produced from a monomeric vinyl compound containing a carbalkoxy group or if the monomeric vinyl compound does not contain a carbalkoxy group then it is interpolymerized with a compound which contains such a group in order that the resulting water-insoluble polymer will possess at least one carbalkoxy group for every 50 carbon atoms of the linear polymer chain, and as a general rule, a larger number of carbalkoxy groups should advisably be present thereon.

This invention is also directed to the aqueous dispersions referred to above, the continuous films produced by spreading said dispersions on a substrate and drying them, and articles coated or finished with such films.

The invention may be more readily understood by a consideration of the following illustrative examples wherein the quantities are stated in parts by weight:

Example 1

A dispersion of polymer, obtained from a peroxide-catalyzed emulsion polymerization of vinyl chloride monomer containing 5% dimethyl fumarate monomer, which has 18% dispersed solids, is blended at 20–25° C. with a 10% aqueous solution of a completely hydrolyzed ethylene/vinyl acetate interpolymer (containing 5% by weight of ethylene) using amounts of each material so as to give a proportion of 5 parts insoluble polymer to one part of soluble polymer in the final composition. The resulting composition forms a smooth, moderately viscous dispersion which has excellent stability. Spread over a smooth substrate such as metal, glass or wood and allowed to evaporate at ordinary temperature the dispersion dries to give clear, hard, flexible coatings which show good adhesion. Similar coatings obtained under baking conditions at about 100° C. (one-half to one hour) have the same film properties but show even better resistance toward softening by water. Under the same conditions of air drying or baking, a dispersion of the unmodified vinyl chloride/dimethylfumarate interpolymer (without the soluble hydrolyzed ethylene/vinyl acetate interpolymer) yields only a thin powdery film.

The amount of water-soluble modifier in the above composition may be increased in any proportions desired up to compositions containing as high as 80% by weight of the hydrolyzed ethylene/vinyl acetate interpolymer. As the proportion of the latter is increased the resulting coatings become more flexible and are easily plasticized upon exposure to water. However, films containing high concentrations of the water-soluble modifier do not dissolve upon contact with water and on drying regain completely their initial properties. The more flexible products are especially suitable for the coating of fabrics or paper.

Pigments, such as titanium oxide milled in water, may be added to the above composition to give smooth dispersions which on drying yield attractive films having a slight gloss.

It is very surprising that the above noted advantageous results are not obtained when the hydrolyzed ethylene/vinyl acetate interpolymer is replaced by such chemically closely related material as polyvinyl alcohol itself or a water-soluble party hydrolyzed polyvinyl acetate. In such cases, the resulting films have very poor resistance to exposure to water, as shown by the fact that the films soften greatly or may dissolve upon contact with water.

*Example 2*

A methyl methacrylate polymer dispersion is prepared by polymerizing the monomer in the presence of 0.35% sodium cetyl sulfate and 0.2% ammonium persulfate and sufficient water to give a dispersion containing 25% of the polymer. This dispersion is blended at 20–25° C. with a 10% aqueous solution of a completely hydrolyzed ethylene/vinyl acetate interpolymer, containing 5% ethylene, using sufficient amounts of each material to give the proportions of ingredients desired in the final composition. At a ratio of one part water-soluble polymer to ten parts dispersed (methyl methacrylate) polymer the composition forms fairly coherent films which, however, are cloudy. If the ratio is increased to above about one part of water-soluble polymer to five parts of dispersed polymer, the blended compositions on drying deposit clear, continuous films. Such a composition containing one part water-soluble, hydrolyzed ethylene/vinyl acetate polymer and three parts dispersed methyl methacrylate polymer on drying yields clear, continuous films which have excellent color and gloss, and good flexibility. Such films upon immersion in water may soften somewhat but upon subsequent drying they regain their original hardness and appearance.

If unmodified polyvinyl alcohol is used as the water-soluble polymer in the above composition in place of the hydrolyzed ethylene/vinyl acetate interpolymers, the resulting films have inferior resistance to water and baking treatments are required if coatings are desired which regain clarity on drying after exposure to water.

It is to be understood that the foregoing examples are representative merely of the manner in which the present invention may be practically carried out. These examples may be varied widely with respect to the individual reactants, the amounts thereof and the conditions of reaction without departing from the scope hereof, as will be obvious to one skilled in the art from a consideration of the instructions heretofore and hereinafter set forth.

In preparing the compositions of this invention it is preferable to use the water-insoluble, dispersed polymers in the form in which they are obtained from the emulsion polymerization procedures. This avoids the expense of converting such dispersions to other compositions. These aqueous dispersions may also contain small amounts of surface-active agents, peroxides, salts, and other ingredients which are of value in the polymerization reaction or which may be helpful in the succeeding blending or film-forming procedures. It is to be understood that other forms of dispersed polymers may also be employed, for example, those obtained by milling plastic polymers with surface-active agents followed by dispersion in water. The dispersions used herein should, as a general rule, have a small average particle size of 10 microns diameter or less, and preferably a particle size of 0.01 to 1.0 micron diameter. Furthermore, they should, for most purposes, be free from conglomerated or aggregated groups of particles.

It has been found that the water-insoluble dispersed polymers are of particular advantage herein if they are substituted with esterified carboxyl groups, i. e., carbalkoxy groups. It is possible that these groups enter into an associated or coordinate covalence state with the water-soluble hydrolyzed interpolymer when water is removed from the system, such as on drying in a solid film form. Whether this is the reason for the excellent results or not, the fact remains that the water-insoluble polymer should ordinarily be substituted with carbalkoxy groups for the best results. The concentration of carbalkoxy groups will, of course, depend to a considerable extent upon the individual components of the composition and upon the purposes for which such compositions are to be used. As a general rule, it may be stated that the water-insoluble polymer should contain at least one carbalkoxy group for every fifty carbon atoms of the linear polymer chain.

Vinyl polymers such as polyvinyl chloride which contain no carbalkoxy groups do not have the conjoint action just referred to. When a suitable concentration of carbalkoxy groups is introduced into such polymers by copolymerization with suitable vinyl monomers containing ester groups, for example, methyl acrylate, methyl methacrylate or a dialkyl fumarate or maleate such as diethyl fumarate, dimethyl maleate, etc., the polymers are then entirely suitable in the process of this invention and they give useful, coalesced films or coatings. High proportions of carbalkoxy groups in the polymer or copolymer tend toward increased compatibility. Among the water-insoluble monoethylenic carbalkoxy polymers suitable for the practice of this invention, in addition to the simple carbalkoxy polymers such as methyl methacrylate, ethyl acrylate, etc., are the following: vinyl chloride/methyl methacrylate, vinyl chloride/ethyl acrylate, acrylonitrile/methyl methacrylate, ethylene/methyl methacrylate, butadiene/methyl methacrylate, chloroprene/methyl methacrylate, vinyl fluoride/methyl fumarate, vinyl fluoride/methyl methacrylate, vinylidene chloride/ethyl acrylate, and the like. Two or more of the foregoing, or related polymers, may, of course, be employed.

The compatibilizing agent is a hydrolyzed interpolymer of ethylene and one or more vinyl carboxylates. Among such vinyl carboxylates may be mentioned vinyl acetate, vinyl formate, vinyl propionate, vinyl benzoate, etc. Superior results are in general obtained by the employment of an interpolymer of ethylene and vinyl acetate, and that is to be understood as the preferred embodiment of the invention. The degree of hydrolysis of these interpolymers may vary, but it is considered advisable to select interpolymers which are substantially completely hydrolyzed. These interpolymers are described in U. S. Patent No. 2,386,347. They contain between about 0.5% and about 10%, by weight, of ethylene. The presence of ethylene is of notable importance therein since vinyl acetate, for example, in the absence of ethylene, produces compositions which are noticeably inferior to those obtained when the vinyl acetate is interpolymerized with a small amount of ethylene.

The weight ratio of water-soluble, hydrolyzed interpolymer to water-insoluble, carbalkoxy vinyl polymer should be within the range of from 15/85 to 80/20. If a larger amount of water-soluble polymer is employed the films tend to become unduly water-sensitive. The preferred weight ratio of water-soluble hydrolyzed interpolymer to water-insoluble carbalkoxy vinyl polymer is from 1/5 to 1/2.

The concentration of water-soluble hydrolyzed ethylene/vinyl acetate interpolymer in the aqueous phase should be greater than about 3% and preferably from 5% to 30%. The concentration of the water-insoluble polymer in the aqueous phase is not critical but from a practical standpoint it should generally be from about 10% to about 50%.

Other ingredients may be added to the dispersions of this invention depending upon the application for which these compositions are intended. If pliable films are desired suitable plasticizers may be dispersed into the compositions. Alternatively, the plasticizer may be blended into the polymer before the dispersion is prepared, or in limited cases a water-soluble plasticizer may be dissolved in the aqueous phase of the dispersion. The choice of the plasticizer will depend upon the dispersed polymer which is used, such selection being readily made through simple testing by anyone skilled in the art. Colored films are obtainable by incorporating suitable dyes or colored pigments into either dispersed polymer phase or the aqueous phase of these compositions. Pigments, fillers, extenders or resins may be incorporated into these dispersions but care must be exercised in the choice of such ingredients to avoid coagulation of the dispersion or excessive flocculation of any dispersed material which is added. Heat hardening resins such as urea-formaldehyde, urea-melamine, or phenol-formaldehyde may also be incorporated in these compositions. It is usually advantageous to blend or disperse such materials, for example pigments, into water or into the water-soluble hydrolyzed ethylene/vinyl acetate solution before the water-insoluble, dispersed polymer is added. This results in smoother dispersions having improved stability compared to compositions prepared in reverse order. Among the materials of the above types which may be used are the following: titanium oxide, zinc oxide, iron oxide, antimony oxide, barium carbonate, barium sulfate, calcium carbonate, lake pigments, asbestine, finely divided mica, powdered silicon dioxide, powdered metals, powdered resins, and the like.

These compositions in pigmented or unpigmented forms may be applied to fibrous or non-fibrous surfaces and materials, for example glass, metals, wood, paper, leather, linen, silk, cotton textiles, regenerated cellulose film, concrete, masonry, bricks, stone, and the like, to give protective or decorative effects.

The term "carbalkoxy" when used herein is understood to have its commonly accepted meaning, namely, a —COOR group wherein R is an alkyl radical. A typical polymer having extra-linear carbalkoxy groups is polymethyl acrylate.

The hydrolyzed interpolymers of ethylene and vinyl acetate or other vinyl carboxylates referred to herein are soluble in water at elevated temperatures of the order of about 80° C., although sometimes the aid of a small amount of solvent such as about 10% of alcohol is necessary. As mentioned in U. S. Patent No. 2,386,347, hydrolyzed ethylene-vinyl acetate interpolymers do not dissolve in cold water but dissolve in hot water and upon cooling the polymer does not readily separate from the aqueous solution.

As many widely different embodiments of this invention may be made without departing from the spirit and scope thereof, it is to be understood that the invention is not limited to the specific embodiments thereof except as defined in the appended claims.

We claim:

1. A composition comprising an aqueous dispersion of a water-insoluble, film-forming linear polymer containing more than one carbalkoxy group for every fifty carbon atoms of the linear polymer chain and selected from the group consisting of homopolymers of methyl methacrylate, methyl acrylate and ethyl acrylate, and copolymers with vinyl chloride of methyl methacrylate, methyl acrylate, ethyl acrylate, dimethyl fumarate and dimethyl maleate, blended with an aqueous solution of a substantially completely hydrolyzed interpolymer of ethylene and vinyl acetate that is soluble in water at 80° C. and contains between 0.5% and 10% by weight of ethylene, the weight ratio of said hydrolyzed interpolymer to said water-insoluble polymer being within the range of from 15/85 to 80/20, the concentration of said water-insoluble polymer in the aqueous phase being from 10% to 50% and the concentration of said hydrolyzed interpolymer in the aqueous phase being from 5% to 30%.

2. A composition comprising an aqueous dispersion of between 20 and 85 parts by weight of a water-insoluble, film-forming homopolymer of methyl methacrylate, blended with an aqueous solution of between 15 and 80 parts by weight of a substantially completely hydrolyzed interpolymer of ethylene and vinyl acetate, that is soluble in water at 80° C. and contains between 0.5% and 10% by weight of ethylene, the concentration of said polymers in the aqueous phase being from 5% to 30% for the hydrolyzed interpolymer and from 10% to 50% for the water-insoluble polymer.

3. A process for producing continuous flexible films which comprises blending an aqueous dispersion of a water-insoluble, film-forming linear polymer containing more than one carbalkoxy group for every fifty carbon atoms of the linear polymer chain and selected from the group consisting of homopolymers of methyl methacrylate, methyl acrylate and ethyl acrylate, and copolymers with vinyl chloride of methyl methacrylate, methyl acrylate, ethyl acrylate, dimethyl fumarate and dimethyl maleate with an aqueous solution of a substantially completely hydrolyzed interpolymer of ethylene and vinyl acetate that is soluble in water at 80° C. and contains between 0.5% and 10% by weight of ethylene, the weight ratio of said hydrolyzed interpolymer to said water-insoluble polymer being within the range of from 15/85 to 80/20, the concentration of said water-insoluble polymer in the aqueous phase being from 10% to 50% and the concentration of said hydrolyzed interpolymer in the aqueous phase being from 5% to 30%, spreading the blended dispersion over a base material and evaporating the liquid therefrom.

4. A process for producing continuous flexible films which comprises blending an aqueous dispersion of between 20 and 85 parts by weight of a water-insoluble, film-forming homopolymer of methyl methacrylate, with an aqueous solution of between 15 and 80 parts by weight of a substantially completely hydrolyzed interpolymer of ethylene and vinyl acetate, that contains between 0.5% and 10% by weight of ethylene, spreading the blended dispersion over a base material and evaporating the liquid therefrom, the concentration of said polymers in the aqueous phase being from 5% to 30% for the hydrolyzed interpolymer and from 10% to 50% for the water-insoluble polymer.

GERALD T. BORCHERDT.
HENRY S. ROTHROCK.

REFERENCES CITED

The following references are of record in the file of this patent:

UNITED STATES PATENTS

| Number    | Name    | Date          |
|-----------|---------|---------------|
| 2,343,091 | Smith   | Feb. 29, 1944 |
| 2,386,347 | Roland  | Oct. 9, 1945  |
| 2,491,880 | Blyler  | Apr. 29, 1947 |

FOREIGN PATENTS

| Number  | Country       | Date         |
|---------|---------------|--------------|
| 466,173 | Great Britain | May 20, 1937 |
| 490,032 | Great Britain | of 1938      |